US006334700B2

United States Patent
Ramer et al.

(10) Patent No.: US 6,334,700 B2
(45) Date of Patent: *Jan. 1, 2002

(54) DIRECT VIEW LIGHTING SYSTEM WITH CONSTRUCTIVE OCCLUSION

(75) Inventors: David P. Ramer, Reston; Jack C. Rains, Jr., Herndon; Richard S. Bagwell, Chesterfield, all of VA (US); George David Crowley, III, Chevy Chase, MD (US)

(73) Assignee: Advanced Optical Technologies, L.L.C., McLean, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/397,143

(22) Filed: Sep. 16, 1999

Related U.S. Application Data

(63) Continuation-in-part of application No. 09/050,175, filed on Mar. 30, 1998, now Pat. No. 5,967,652, which is a continuation of application No. 08/590,290, filed on Jan. 23, 1996, now Pat. No. 5,733,028.

(51) Int. Cl.[7] .................................................. F21V 7/00
(52) U.S. Cl. ....................... 362/298; 362/301; 362/346; 362/350; 362/800
(58) Field of Search ................................ 362/301, 303, 362/235, 298, 800, 346, 350

(56) References Cited

U.S. PATENT DOCUMENTS

| 4,707,773 A | * | 11/1987 | Miyamoto | 362/303 |
|---|---|---|---|---|
| 5,143,433 A | * | 9/1992 | Farrell | 362/29 |
| 5,192,124 A | * | 3/1993 | Kawashima et al. | 362/61 |
| 5,733,028 A | | 3/1998 | Ramer et al. | 362/32 |
| 5,877,849 A | | 3/1999 | Ramer et al. | 356/3.01 |
| 5,914,487 A | | 6/1999 | Ramer et al. | 250/237 |
| 5,967,652 A | | 10/1999 | Ramer et al. | 362/552 |
| 6,019,493 A | * | 2/2000 | Kuo et al. | 362/800 |

FOREIGN PATENT DOCUMENTS

| WO | WO09727450 | 7/1997 |
|---|---|---|
| WO | WO09950626 | 10/1999 |

* cited by examiner

*Primary Examiner*—Sandra O'Shea
*Assistant Examiner*—John Anthony Ward
(74) *Attorney, Agent, or Firm*—McDermot, Will & Emery

(57) ABSTRACT

A system utilizing direct-view illumination of selected regions together with principles of constructive occlusion (diffuse reflectivity in a mask and cavity structure) provides a tailored radiation intensity distribution adapted to meet the requirements of certain special applications. The direct illumination provides high intensity illumination for certain desired regions. However, some radiant energy from the system source(s) reflects and diffuses within the volume between the mask and the cavity. The mask constructively occludes the aperture of the cavity. The reflected energy emerging from between the mask and cavity provides a desired illumination, for example at a much lower intensity, for regions not covered by the direct illumination. For example, in an embodiment wherein the direct illumination provides light over angles near the system horizon, the constructive occlusion in the mask and cavity arrangement provides lower intensity illumination in regions at higher elevation angles up to the system axis.

29 Claims, 6 Drawing Sheets

DIRECT VIEW LIGHTING SYSTEM WITH CONSTRUCTIVE OCCLUSION

RELATED APPLICATIONS

This application is a continuation in part of U.S. application Ser. No. 09/050,175, filed Mar. 30, 1998 (issued Oct. 19, 1999 as U.S. Pat. No. 5,967,652); which is a continuation of U.S. application Ser. No. 08/590,290, filed Jan. 23, 1996 (issued Mar. 31, 1998 as U.S. Pat. No. 5,733,028).

FIELD OF THE INVENTION

The present invention relates to systems for illuminating a desired area with electromagnetic radiation, such as visible or infrared light, with a desired intensity distribution, using a combination of direct radiation over a portion of the desired area together with constructive occlusion to fill in other regions of the desired area. In one type of visible lighting system, for example, an embodiment of the invention uses direct illumination to provide relatively high intensity illumination in regions near the system horizon for a full circle around the system. The exemplary embodiment utilizes principles of constructive occlusion to provide a lower intensity illumination for higher elevation regions up to the vertical axis of the system.

BACKGROUND

Radiant or electromagnetic energy emitters and distributors find a wide range of applications in modern society. Visible illumination systems, for example, illuminate areas and surfaces to enable use by personnel even though natural ambient lighting might be insufficient. Infrared illumination is a critical component of many night-vision technologies. Other lighting devices provide guidance or warnings, for example to enable pilots to locate the edges of runways or taxiways, to illuminate emergency exit paths, to visibly indicate the emergency, etc.

Different applications of radiant energy illumination systems require different performance characteristics. For example, a visible illumination application might require that the lighting system provides a desired minimum intensity over a flat surface of specified dimensions about an axis of the lighting system, at a known distance from the system along its axis. Simple radiation sources, such as light emitting diodes (LEDs) or light bulbs with reflectors and/or lenses typically provide a high intensity radiation in regions close to the axis, but the intensity drops of quickly at angles approaching the horizon. On an illuminated surface, the intensity is not uniform. To provide a desired illumination at edges of a design footprint, the source often will emit substantially higher amounts of radiation than necessary along the axis.

Prior attempts to provide desired intensity distributions have involved complex arrangements of sources, lenses and reflectors. These complex arrangements tend to be relatively expensive and sensitive to problems of misalignment, which limits ruggedness and durability.

As another example of a difficult lighting application, consider an airport lighting system. The regulatory authority requires a high intensity illumination for regions near the horizon, such as from the horizon up to an elevation of about 6°. The airport light must also emit some light at higher elevations, including along the vertical axis; however, the intensity required at higher elevations may be an order of magnitude lower than that near the horizon. Existing blue taxiway lights and other runway lights utilize conventional light-bulb technologies. Such lamps do meet the requirement for illumination at the horizon as well as illumination above, although they tend to over illuminate areas at high elevations above the horizon, in order to provide adequate intensity at all necessary angles. As such, they tend to consume more power than is necessary. More importantly, the lamp burns out and must be replaced every 2000 hours or so.

Efforts are underway to develop a runway/taxiway lighting system utilizing LEDs, because of the long life of such light sources (hundreds of thousands of hours). However, to achieve the necessary coverage with adequate intensity, LED-based systems have used a complex matrix with a large number LEDs. For example, horizontal LEDs might irradiate low elevation regions, but additional sets of LEDs directed to higher elevations and one or more vertically directed LEDs are needed to fill-in various portions of the field of illumination. Examples of such systems have included as many as 40–60 LEDs. As a result, the LED-based system becomes quite expensive to construct and draws an inordinate amount of electrical power.

U.S. Pat. No. 5,733,028 issued Mar. 31, 1998 to Ramer et al. discloses a number of embodiments of illumination systems that utilize constructive occlusion. With this technology, a mask occludes an active optical surface, typically a Lambertian surface formed by the aperture of a diffusely reflective cavity, in order to distribute radiant energy with a tailored intensity distribution. The disclosure there emphasizes uniformity of the intensity distribution, for example with respect to angles extending over a hemispherical radiation pattern. Adjustment of the parameters of the constructive occlusion system enables the system designer to tailor the system performance to a wide range of applications. Constructive occlusion typically emphasizes distribution based on multiple diffuse reflections within a mask and cavity system. Careful selection of the system parameters can adapt the constructive occlusion system to meet the requirements of many diverse illumination applications.

However, a need still exists for radiant energy or electromagnetic emission and distribution systems, which can satisfy certain extreme requirements in differences in intensity distribution. Such systems must be relatively simple in structure, to minimize cost and maximize durability. Also, such systems should be able to achieve a desired intensity distribution, with large variations in power at different angles of illumination, without requiring excessive input power or over illumination at any particular angle, to thereby maximize efficiency.

DISCLOSURE OF THE INVENTION

To meet the above stated needs and objectives, the inventions combine direct illumination from a source with illumination provided by constructive occlusion techniques. Such a combination of different types of illumination can precisely satisfy design requirements of more than an order of magnitude difference in illumination intensities in different segments of an intended region of illumination. The direct illumination from the source provides high intensity illumination for certain desired regions. Some radiant energy from the source also diffuses and reflects between the mask and cavity of the constructive occlusion system. The parameters of the mask and cavity are such that radiant energy processed by those elements provides a tailored intensity distribution, including a predetermined low intensity illumination in a region not covered by the direct illumination.

In one aspect, the inventions relate to systems for projecting electromagnetic radiation, such as visible light. Such a system includes a base having a first defined area substantially facing a region to be illuminated with the electromagnetic radiation. This area of the base has a reflective characteristic with respect to the electromagnetic radiation. The system also includes a mask. The mask is positioned between the base and the region to be illuminated at a predetermined distance from the defined area of the base. The mask also has a defined area, substantially facing the area on the base, which has a reflective characteristic with respect to the electromagnetic radiation. One of the defined areas has a cavity. The inner surface of the cavity has a substantially diffuse reflective characteristic with respect to the electromagnetic radiation. The mask occludes electromagnetic radiation emerging from an aperture of the cavity. The inventive system also includes a source. The source emits a substantial first portion of the electromagnetic radiation directly into a predetermined section of the region to be illuminated. The source also emits a substantial second portion of the electromagnetic radiation into the cavity. The direct radiation provides a relatively high intensity illumination in the predetermined section, whereas the base, mask and cavity provide a tailored intensity distribution of the second portion of the electromagnetic radiation over another predetermined section of the region to be illuminated.

The second portion of the electromagnetic radiation provides a relatively low intensity illumination over at least a portion of the second illuminated section. Many applications of the system actually provide an intensity of the direct illumination that is an order of magnitude higher than the lowest desired intensity in the section of tailored illumination covered by the constructive occlusion.

Several of the preferred embodiments provide the low intensity illumination in regions about an axis of the mask and cavity system. In such cases, the direct, high intensity illumination covers angles relatively far-off the axis. For example, the system may provide the high intensity at angles directed towards distant edges of a wide planar surface, which is uniformly illuminated by the system. Other exemplary embodiments provide the high intensity illumination at angles approaching the system horizon.

The inventive system may utilize a variety of reflective materials. Preferred embodiments utilize materials providing diffusely reflective surfaces on the elements of the constructive occlusion system. The preferred embodiments of the mask and cavity system also include a reflective shoulder, formed around a portion or around the entire aperture of the cavity. The system may also include a reflective baffle, in the region between the mask and the cavity surface, to reflect additional light into certain regions of the desired field of illumination, typically at relatively large angles with respect to the axis of the mask and cavity.

Another inventive aspect relates more specifically to an airport lighting system, designed to meet the particular requirements for airport lighting. This system includes a cavity with a diffusely reflective inner surface. A reflective shoulder surrounds at least part of the aperture of the cavity. The system also includes a mask. The mask is outside the cavity at a distance from the aperture, between the aperture and a region to be illuminated. The surface of the mask facing toward the aperture is reflective. The system also includes a source of radiant light energy. The source is positioned between the mask and the aperture, for example near the reflective surface of the mask. The mask is sufficiently spaced from the aperture of the cavity such that the source directly emits a substantial first portion of its radiant light energy into a region adjacent to a horizon of the system. This direct emission provides a relatively high intensity illumination. The source emits a second portion of its radiant light energy into the cavity. The reflective surface of the mask constructively occludes the aperture of the cavity, so that the system radiates the second portion of the radiant light energy into a region at higher elevations above the horizon, but with a relatively lower intensity distribution.

Such an airport lighting system can efficiently provide high intensity illumination near the horizon, for example, from the horizon up to angles of at least 6°. Such systems also efficiently satisfy the requirements for lower intensity illumination at higher elevation angles. A preferred embodiment utilizes LEDs as the light source. Such embodiments typically include a series of LEDs arrange in a ring, with the LEDs facing outward to radially emit the direct illumination energy into the regions near the horizon. The inventive system utilizes far fewer LEDs, when compared to prior attempts to provide airport lighting using LEDs. Consequently, the cost of the system as well as the power consumption (one cost of operating the system) are much lower.

Another inventive aspect relates to a system for projecting electromagnetic radiation with a tailored intensity distribution. The distribution includes a high intensity portion in a first angular region of an area to be illuminated and a low intensity portion in a second angular region of the area to be illuminated. This system includes a diffusely reflective cavity with an aperture. A mask outside the cavity constructively occludes the aperture with respect to at least the second angular region. The mask has a reflective surface facing toward the aperture. The mask and cavity provide the low intensity portion of the illumination distribution. The inventive system also includes means for directly illuminating the first angular region with electromagnetic energy to provide the high intensity portion of the illumination distribution and for supplying electromagnetic radiation into the cavity.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The present invention utilizes principles of constructive occlusion (diffuse reflectivity in a mask and cavity structure) together with direct-view illumination of selected regions, to tailor radiation intensity distribution to the requirements of certain special applications. The direct illumination provides high intensity illumination for certain desired regions, for example at elevation angles near the horizon or directed to edges of a wide planar area to be illuminated. Some light from the system source(s) reflects and diffuses within the volume between the mask and the cavity. The mask constructively occludes the aperture of the cavity. The parameters of the mask and the cavity are selected such that the reflected light emerging from between the mask and the cavity provides a desired illumination, for example at a much lower intensity, for regions not covered by the direct illumination. In an embodiment wherein the direct illumination covers angles near the horizon, for example, the constructive occlusion provides lower intensity illumination in regions at higher elevation angles. The inventive systems may provide a variety of other intensity distributions, for example, to facilitate a uniform distribution over a particularly wide planar target surface.

The combination of direct view illumination with constructive occlusion enables the designer to precisely tailor the illumination system to the needs of a particular application. As a result, the designer need not over-radiate one area to meet the requirements for radiation in another area. Consequently, the system provides particularly high efficiencies and enables the use of lower power and/or smaller or fewer sources of radiant energy. The illuminating systems are relatively simple in design, making the inventive devices relatively cheap to manufacture as well as more durable than prior systems designed to meet similar application requirements. The invention also enables the use of more modern, dependable sources, such as LEDs.

Those skilled in the art will recognize that the principles of the present invention are applicable to distribution of various forms or wavelengths of radiant energy or electromagnetic radiation. The preferred embodiments relate to illumination with visible light, and the following discussion will concentrate on discussion of lighting systems, although clearly the invention encompasses radiation of other forms of electromagnetic energy.

Figure 1:
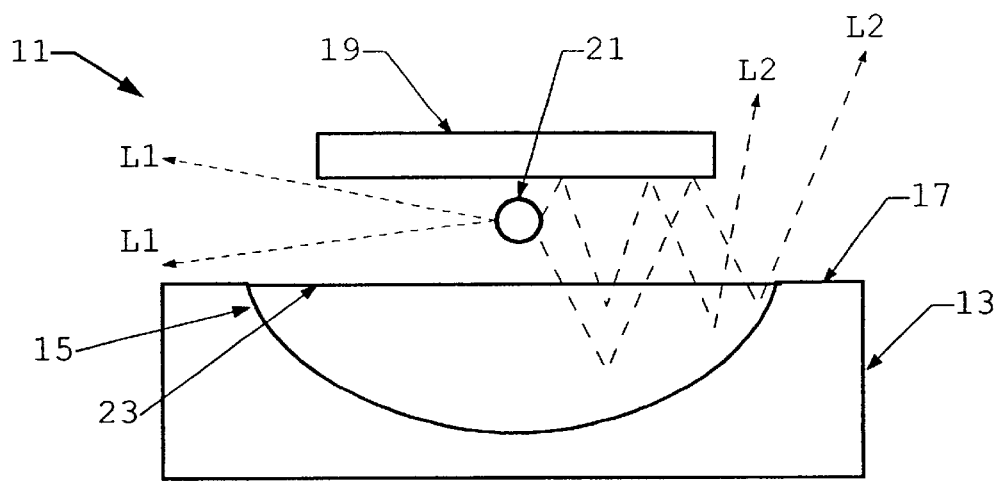
FIG. 1 is a cross-sectional view of a simple embodiment of an illumination system utilizing direct radiation in combination with constructive occlusion, in accord with the principles of the present invention.

FIG. 1 depicts a first, simple embodiment of a light distributor apparatus 11, for projecting light with a tailored intensity distribution. The light distributor 11 includes a disk-shaped base 13 having a cavity 15 formed in its upper side, surrounded by a flat, ringshaped shoulder 17. A diskshaped mask 19 is disposed between the cavity aperture 23 and the field to be illuminated.

In many embodiments, the cavity 15 comprises a substantial segment of a sphere. For example, the cavity may be hemispherical. However, the cavity's shape is not of critical importance. A variety of other shapes may be used. For example, half-cylindrical cavities having a square or rectangular aperture or even having a nearly linear aperture with a narrow rectangular opening are contemplated for certain specific applications requiring a more rectangular illumination footprint. Practically any cavity shape is effective, so long as it has a diffuse reflective inner surface. A hemisphere is preferred for the ease in modeling its azimuthal symmetry and for its ease in construction. In illustrated embodiments, the base is circular although other shapes may be used.

The system 11 may be oriented in any desired manner to facilitate illumination of a particular target area, region or surface. In the orientation shown, the system 11 would provide light outwardly and generally upward above the system, for example to provide guidance on an airport taxiway. Inverted, the system 11 could be mounted on a ceiling or lamppost to illuminate the floor or the ground. Turned to either side, the system might illuminate a design or decoration on a wall or provide illumination along an emergency exit path.

The mask 19 is positioned between the base 13 and the target area, region or surface to be illuminated. As such, the mask 19 is outside of the cavity 15. For example, in the orientation shown, the mask 19 is above the aperture 23 of the cavity 15 in the base 13. A source 21 emits electromagnetic radiation, for example as visible light. The system may include a variety of different types of sources, including light bulbs, one or more LEDs, and one or more optical fibers coupled to remote light generation components. In the example, shown the source is an idealized spherical source emitting radiation in virtually all directions.

In this first embodiment, the base 13 and the mask 19 preferably are formed of a suitable diffusely reflective material such as Spectralon®, which is a highly reflective polymeric block material manufactured and sold by Labsphere, Inc., of North Sutton, N.H. This material is easily machined and very durable, and it provides a highly efficient Lambertian surface having a reflectance of more than 99%, for visible and near-infrared wavelengths. A Lambertian surface emits light with substantially uniform intensity in all directions.

Alternatively, the base 13 and the mask 19 could be constructed of a suitable base material of, for example, aluminum or plastic, with a coating of a diffuse reflective material such as barium sulfate or Spectralon on the appropriate surfaces. Other suitable materials, though less effective than the diffuse reflective materials identified above, include quasi-diffuse reflective materials, such as gloss white paint. The use of such materials provides improved performance over prior light distributors.

For protection, the base preferably is encased in a plastic or metal housing (not shown). A transparent dome (also not shown) may be formed of a suitable material such as Pyrex®.

The light source 21 emits some light into the base cavity 15, and this light is redirected outwardly by multiple diffuse reflections from the base and the mask, as discussed more later. In accord with the invention, the source is positioned between the mask 19 and the cavity 15 in such a manner that it also emits a substantial portion of radiation into a predetermined region within the area of desired illumination. For this purpose, the source 21 is mounted in the region between the aperture 23 of the cavity 15 and the surface of the mask 19 facing toward the aperture. In the example of FIG. 1, the source is mounted just below the facing surface of the mask 19. In such an embodiment, the edges of the mask 19 and the base 13 limit the range of angles of direct radiation, e.g. as shown diagrammatically by the dotted line arrows L1.

In accord with the invention, the region of direct illumination is substantial. Although the precise angular width of this region will vary between different applications, in preferred embodiments, the range of direct illumination may be as little as 6° but is often at least 15° and may be around 30°. Because the source 21 emits light directly into this region, the intensity in this region of direct view illumination is relatively high.

The invention encompasses emitting the direct illumination in different segments of the field of illumination of the inventive systems, as discussed more later. The embodiment of FIG. 1 provides the direct view illumination into the region of low elevation, for example from the horizon up to about 15° above the horizon, in the orientation shown. In this embodiment, the direct illumination covers the circular region from the system horizon up to some specific limiting elevation angle, in this case defined by the lower edge of the mask 19. Although not shown, the direct view illumination may be limited so as to apply only to certain sides or segments of the field of view around the location of the lighting fixture.

As noted, the source 21 also emits a substantial portion of its radiant energy in directions that cause the light to impact on the diffusely reflective surfaces of the mask 19, the cavity 15 and the shoulder 17. The light impacting on the surfaces of the mask and cavity diffuse and redirect the light, typically so that the light reflects and diffuses many times within the space between mask and cavity before emerging from the gap between the outside lower edge of the mask 19 and the edge or rim of the aperture of the cavity 15. FIG. 1 shows two examples of light rays L2 from the source 21 reflected between the underside of the mask 19 and the surface of the cavity 15. As shown, a substantial portion of the diffusely reflected light emerges from the system at higher angles than that emitted for direct illumination.

For purposes of constructive occlusion, the base 13 may be considered to have an active optical area, preferably exhibiting a substantially Lambertian energy distribution. Where the cavity is formed in the based, for example, the planar aperture 23 formed by the rim or perimeter of the cavity 15 forms the active surface with substantially Lambertian distribution of energy emerging through the aperture. Although not shown, if the cavity were formed on the underside of the mask, and the surface of the base was a flat diffusely reflective surface, the active area on the base would essentially be the mirror image of the cavity aperture on the base surface.

In accord with the invention, the mask 19 constructively occludes a portion of the optically active area of the system with respect to the field of illumination. In the example of FIG. 1, the optically active area is the aperture 23 of the cavity 15; therefore the mask 19 occludes a substantial portion of the aperture 23, including the portion of the aperture on and about the axis of the mask and cavity system. The relative dimensions of the mask 19 and aperture 23, for example the relative diameters or radii in the circular embodiment, as well as the height of the mask 19 above or away from the aperture 23, control the constructive occlusion performance characteristics of the light distributor system 11.

Certain combinations of these parameters produce a relatively low but uniform intensity with respect to angles of emission, over a wide portion of the field of view about the system axis (vertical in FIG. 1), covered principally by the constructive occlusion. The areas covered by the direct illumination, however, receive approximately an order of magnitude higher intensity illumination than the minimum of the illumination by constructive occlusion. Other combinations of size and height as well as the angle of direct lighting formed between the perimeter of the cavity and the lower edge of the mask, for example, result in a system performance that is uniform with respect to a wide planar surface perpendicular to the system axis at a fixed distance from the aperture.

The embodiment of FIG. 1 will typically produce high intensity illumination at angles approaching the horizon, or stated another way, at angles approaching 90° from the axis of the system. Systems with such an intensity distribution satisfy the requirements of a number of different applications, including emergency pathway lighting, enunciators for signaling an emergency, and airport lighting for runways and taxiways. Specific embodiments developed for airport lighting are described in detail below, with regard to FIGS. 4–9.

As noted, the first embodiment may produce high intensity illumination at angles approaching the horizon with lower intensity illumination at higher angles up to and including the axis of the system. The inventive structures, however, may produce other types of tailored intensity distributions. For example, in the embodiment of FIG. 2, the source 21' is lower in the system 11', so that the range of direct illumination becomes somewhat elevated above the horizon. The base, 13, cavity 15 and mask 19 are otherwise similar to those shown in FIG. 1 and described above. As such, the system 11' provides similar illumination by the operation of constructive occlusion but provides the higher intensity direct illumination over a substantial range of angles that is somewhat more elevated.

Specifically, in the second embodiment, the source 21' emits a substantial amount of light at appropriate angles for direct illumination. The edges of the mask 19 and the perimeter of the cavity 15 limit the range of angles of direct radiation in the system 11', e.g. as shown diagrammatically by the dotted line arrows L3.

The source 21' also emits a substantial portion of its radiant energy in directions that cause the light to impact on the diffusely reflective surfaces of the mask 19, the cavity 15 and the shoulder 17. Again, the light impacting on the surfaces of the mask and cavity diffuse and redirect the light within the space between mask and the cavity surface. After one or more such reflections within the system, this portion of the illumination energy emerges from the gap between the outside lower edge of the mask 19 and the edge or rim of the aperture 23 of the cavity 15, as shown for example by the light rays L4. A substantial portion of the diffusely reflected light emerges from the system at angles that are still higher than that emitted for direct illumination.

Figure 2:
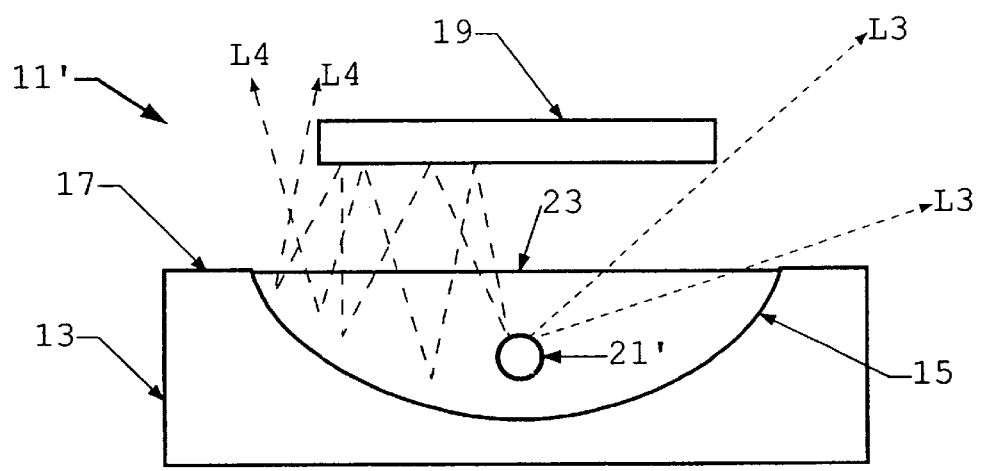
FIG. 2 is a cross-sectional view of another simple example of an illumination system in accord with the invention.

The light distributor of FIG. 2 could be designed to produce a uniform intensity distribution over the area of some surface, such as a planar surface. With respect to angle of emission from the distributor 11', the intensity must be higher in angular regions away from the axis, compared to the intensity in regions nearer the axis. The regions of high intensity may not need to extend to the horizon, but only to an angular region encompassing the desired area of illumination.

Figure 3:
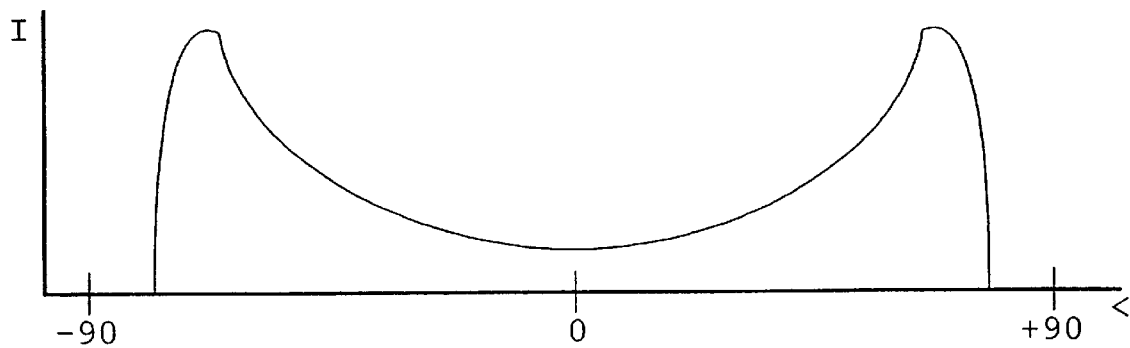
FIG. 3 is an approximation of an illumination intensity distribution graph of a system, such as that of FIG. 2, combining direct illumination with illumination by constructive occlusion to provide uniform illumination of a planar surface.

FIG. 3 is graph depicting an approximation of the intensity vs. angle of emission curve, characteristic of the performance of a light distributor constructed as shown in FIG. 2. To achieve a desired planar uniformity of illumination, the distribution curve as a function of angle from the axis takes the shape of a bat-wing. The illumination device does produce some illumination in the region about the axis (centered around the 0° angle), mainly from light from the shoulder 17 and the segment of the cavity 15 visible between the edge of the mask 19 and the aperture 23, when viewed from a far distance along the system axis. However, the intensity in this angular region is relatively low. As the angle increases toward 90° in either direction, the intensity actually increases due to the dimensions of the aperture and mask. As the angle increases still further, the intensity continues to increase due to the light directly irradiated from the source 21. After a certain angle, the edge of the aperture blocks direct radiation from the source, and the illumination intensity drops off again. For some further range of angles, there is still some illumination, for example provided by light diffused and reflected outward from the shoulder 17 and then by light diffused and reflected from the side surfaces of the mask 19. The illumination intensity falls to 0 at some angle before reaching the horizon in the region of ±90°.

Inventive lighting systems, providing planar uniformity of illumination, find many applications. For example, such systems are advantageous in outside lighting systems, e.g. in parking lots and the like. In such applications, a lighting fixture constructed in accord with the invention provides a uniform illumination over a relatively wide footprint. Typically, the size of a lighting area or footprint is expressed in terms of multiples of "pole-heights," which is the distance of the fixture from the illuminated surface. The use of direct illumination at outer angles, such as provided in the system of FIG. 2, may extend the area of uniform illumination a full pole-height or more outward from the point of intersection with the axis.

In embodiments of the inventive system, at a minimum, the interior surface of the cavity is diffusely reflective, and the surface of the mask facing toward the active area of the base is reflective (preferably diffusely reflective). The surface of the shoulder typically is reflective; however, the precise type reflectivity may be varied to meet different application requirements. In many applications, the shoulder is diffusely reflective, but the shoulder surface may have a specular reflectivity for some applications. For other applications, different sections of the shoulder may have different types of reflectivity. For some applications, the shoulder width may be minimal, or the shoulder may be eliminated entirely.

Figure 4:
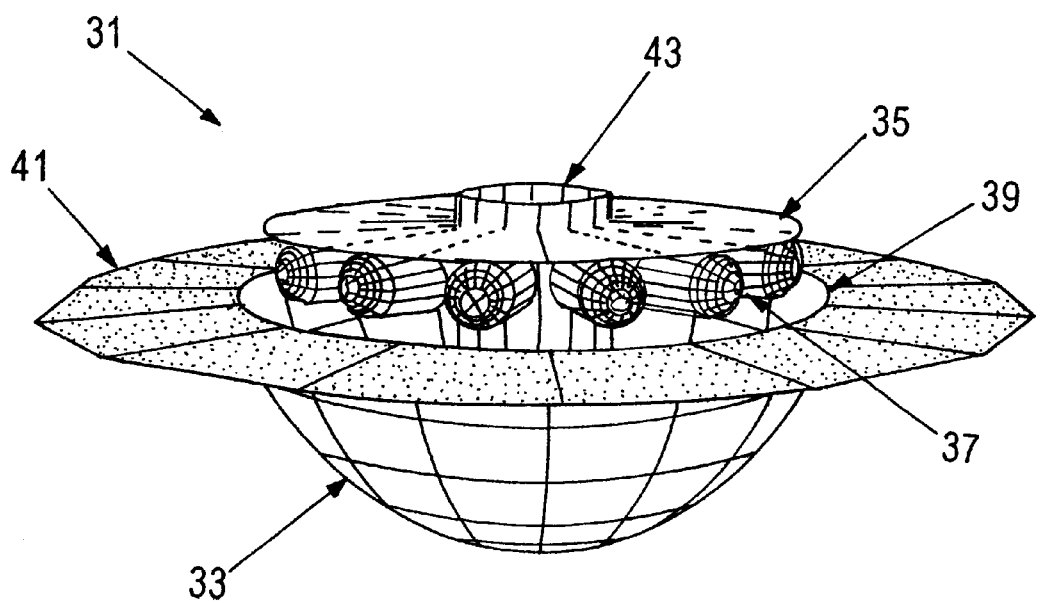
FIG. 4 is a line drawing of a perspective view of an airport lighting system combining direct view with constructive occlusion, in accord with the present invention.
Figure 5:
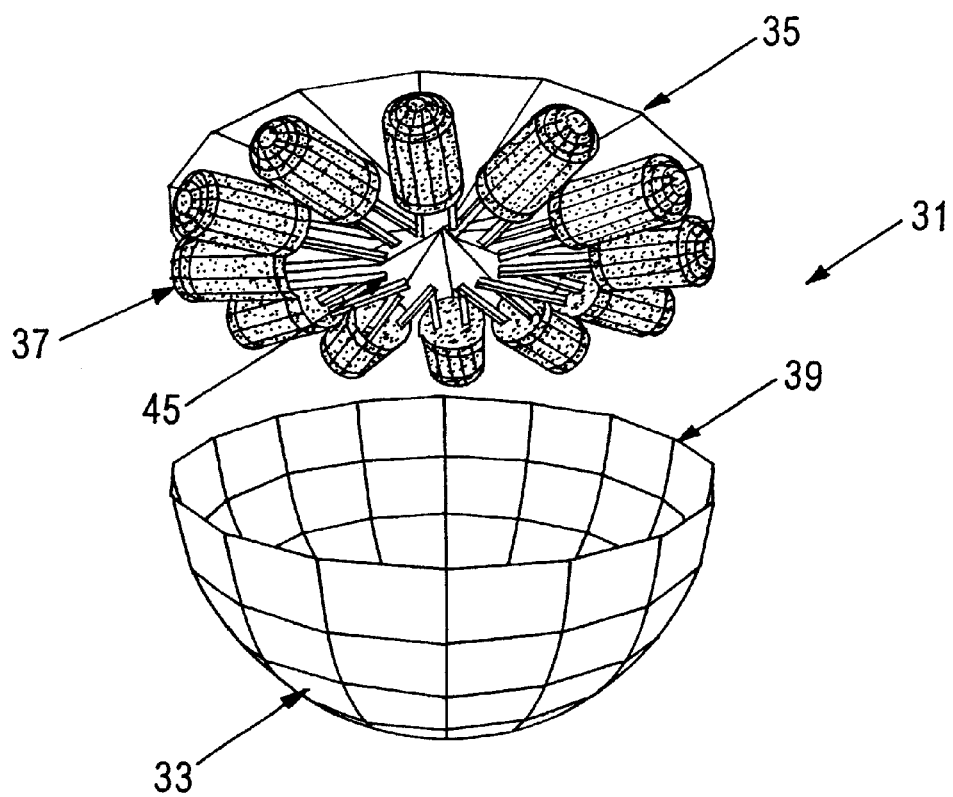
FIG. 5 is a line drawing of a partial, exploded view of the system of FIG. 4, showing the LED light sources, the underside of the mask and the cavity, but with the shoulder omitted for ease of illustration.

FIGS. 4 and 5 show a first embodiment of the invention using LEDs, which is particularly useful in airport lighting systems for runways or taxiways. At extreme off-axis regions, the direct radiation from the source provides a relatively high level of illumination. However, some light from the source impacts on the diffusely reflective surfaces of the mask and cavity. The constructive occlusion of the invention provides lower intensity illumination in the angular range, from where the direct illumination ends, up to and including the system axis (vertical in FIG. 4). Recall that in the runway light example, the specification requires an average illumination of 2 candela from the horizon to at least 6° above the horizon. For angles from 6° up to the system axis (vertical), the specification requires an average illumination of 0.2 candela. The field of illumination around the runway light extends through 360°.

FIG. 4 provides an isometric view of the system 31, whereas FIG. 5 provides an exploded view showing the cavity 33, the mask 35 and the LED light sources 37. Again, the inner surface of the cavity has a substantial diffuse reflective characteristic. At least the surface of the mask facing toward the LEDs 37 and the aperture 39 of the cavity 33 is diffusely reflective. A flat reflective shoulder 41 surrounds the aperture 39 of the cavity. The reflective characteristic of the shoulder 41 preferably provides highly efficient diffusion.

As shown in these drawings, the source used in the system 31 comprises a ring of outwardly facing LEDs 37. The LEDs emit visible light, such as blue light. The mask 35 is positioned outside the cavity 33 at a distance from the aperture 39. The spacing between the lower surface of the mask 35 and the aperture 39 is sufficient for placement of the LEDs 37 in the space between the mask and aperture. As a result, the LEDs have a direct view with respect to a substantial range of elevation angles covering a portion of the area to be illuminated (vertical elevation in the drawings). The gap between the mask 35 and the shoulder 41 defines the effective aperture, limiting the elevational angles directly illuminated by the LEDs 37. The ring of LEDs provides substantially continuous illumination outward around the system 31 (around the horizon in the illustrated orientation). Each LED 37 is oriented to emit light along and about a radius out from the system axis.

Commercially available LEDs of sufficient output power for application to airport lighting typically have either a 15° or 30° nominal field of view. A typical example of one of the LEDs used in the illustrated embodiment might emit direct illumination over approximately a 30° field of view centered about the emission axis. The LED emits 30–40% of its light within this nominal field of view. A ring of 12 radially emitting LEDs 37 provides substantially complete coverage outward around the horizon of the system 31.

In a practical structure built as shown, the LEDs 37 actually are attached to the mask 35. The mask 35 has an opening or tube 43 (FIG. 4) extending away from the cavity 33, for passage of wires (not shown) used to supply electric drive power to the leads 45 (FIG. 5) of the LEDs 37.

As noted, each of the LEDs 37 emits 30–40% of its light within its nominal field of view. Assuming the vertical orientation shown, for angles in the horizontal direction, the light from the LEDs combines to provide the desired full-circle direct illumination. In the vertical direction, most of the light emitted in the nominal field of view passes between the mask 35 and the shoulder 41, to provide the desired high-intensity direct illumination at low elevation angles (near the horizon). The mask and shoulder may limit the LED aperture to further limit the field view somewhat with respect to elevation angle. Also, some of this light directly emitted from the LEDs 37 will diffuse and reflect upward from the surface of the shoulder 41. In this manner, the highest intensity is provided in the elevational region extending up from the horizon, and the intensity from the direct illumination begins to drop off somewhat at the upper edge of the field of view as defined by either the nominal field of view of the LEDs or the limiting aperture formed by the mask and the shoulder.

Each of the LEDs 37 also emits some light at angles outside the nominal field of view of the LED, that is to say further from the LED axis. The mask and cavity system captures much of this additional light, for constructive occlusion type processing and illumination. Specifically, the mask 43 constructively occludes a substantial portion of the aperture 39 of the cavity 33, particularly with respect to high elevational angles going up to and including those at and about the system axis (vertical in FIG. 4). Light captured between the diffuse surfaces of the mask 35 and the cavity 33 reflects and diffuses repeatedly until it emerges from the gap between the outer edge of the mask 43 and the perimeter of the aperture 39. The occlusion by the mask 35 is constructive in that it provides a desirable distribution of light over at least a portion of the intended angular range of illumination by the system 31. In this case, the dimensions and positioning of the mask 35 relative to the aperture 39 are specifically chosen to meet the requirements for illumination at the higher elevation angles, as established for airport lighting systems.

A runway lighting system constructed in accord with the invention could theoretically use a minimum of six LEDs. Preferred embodiments use 10–12 LEDs. The examples shown in FIGS. 4–6 utilize 12 LEDs, for example, where each of which has a 30° field of direct illumination. Alternatively, the system 31 could utilize LEDs with a 15° nominal field of view. However, such a system would then use a series of lenses (not shown) having an astigmatism to spread the light from each LED horizontally but maintain the 15° vertical spread of light emissions from each LED. Any such system, constructed with 15 or fewer LEDs, clearly uses far fewer LEDs than prior attempts to construct airport lighting systems with LEDs. As such, the cost and power requirements are much lower. Also, the simplified structure tends to make the system particularly rugged and durable.

Figure 6:
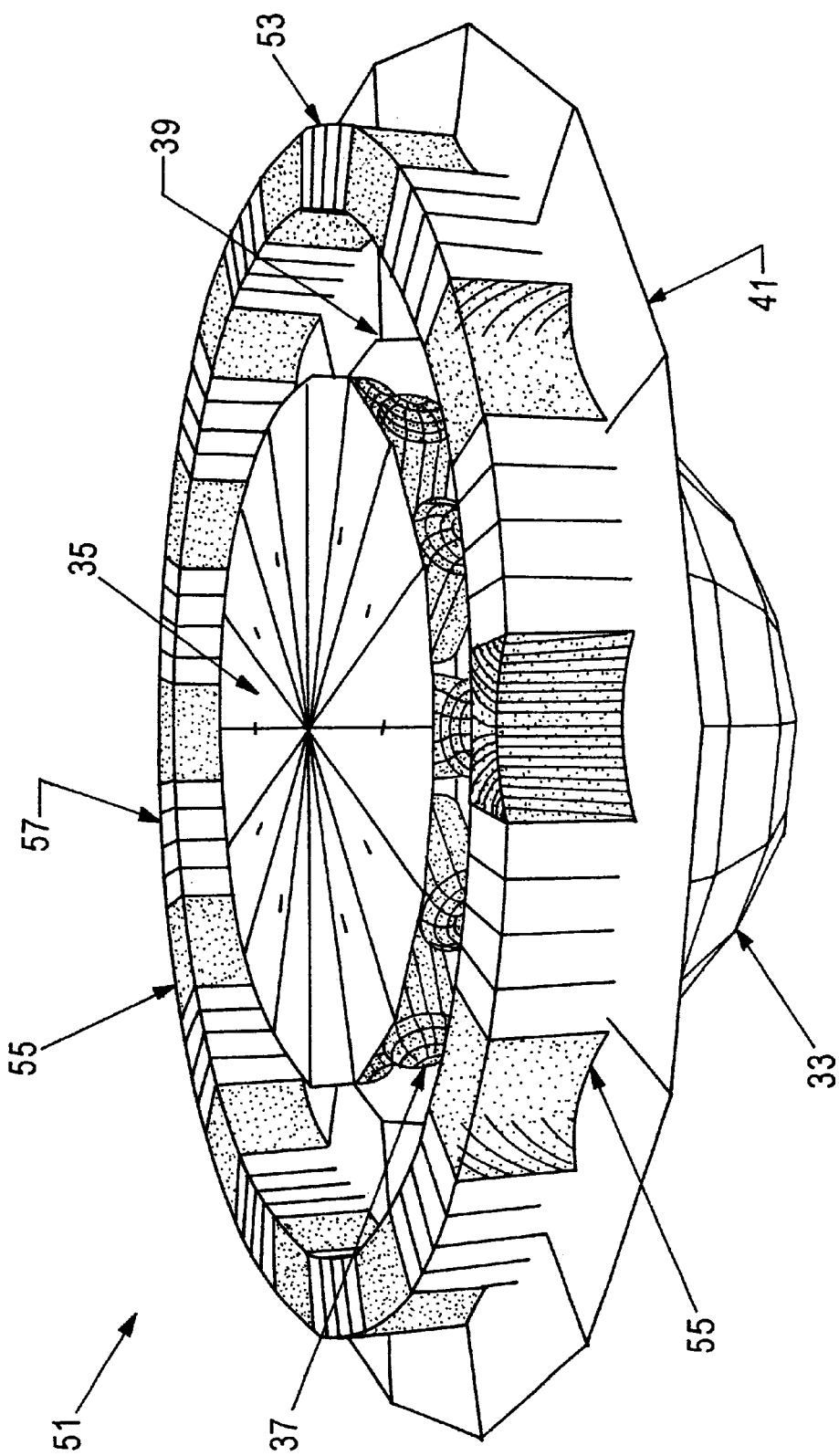
FIG. 6 is a line drawing of an isometric view of another airport lighting system in accord with the present invention.
Figure 7:
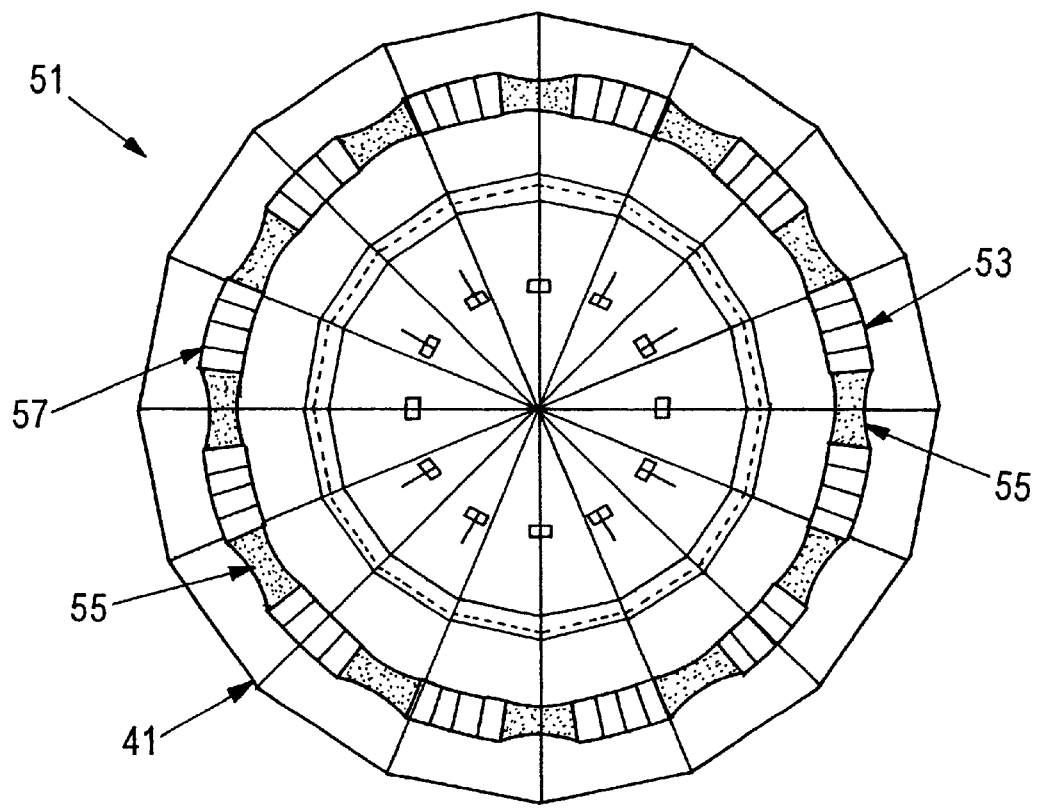
FIG. 7 is a top plan view of the lighting system of FIG. 6.
Figure 8:
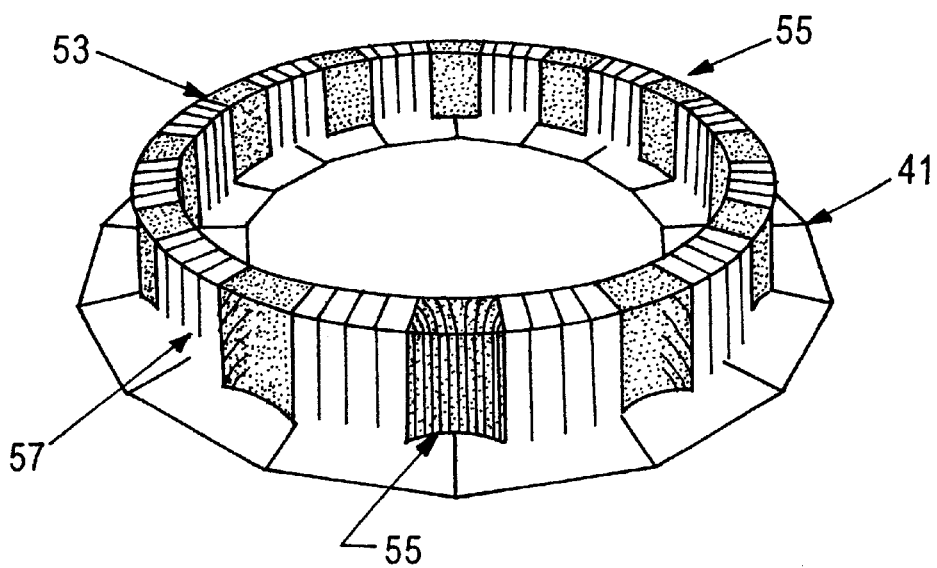
FIG. 8 is a line drawing of an isometric view of the shoulder and lenses of the system of FIG. 6.

FIGS. 6–8 depict a preferred embodiment of an inventive lighting system 51 for taxiway or runway lighting. FIG. 6 is an isometric view of the lighting system 5 1, and FIG. 7 is a top plan view of the system 51. FIG. 8 is a detail view of a lens ring 53 mounted on the shoulder 41.

The system 51 is generally similar to that of FIGS. 4 and 5 in that includes a cavity 33, a mask 35 and a ring of 12 radially directed LEDs 37 located between the aperture 39 and the mask 35. In this embodiment, however, each of the LEDs 37 has a nominal field of illumination of 15°. The nominal 15° field of illumination includes approximately 30–40% of the light from the LEDs and provides adequate intensity for the direct view illumination at low angles of elevation, as required for the airport application.

However, the direct radiations from 12 LEDs with this field of illumination would not cover a full circle (360° in the horizontal direction) around the lighting fixture 51. Accordingly, the system 51 includes a lens ring 53 made of a clear acrylic. The ring 53 is mounted on the shoulder 41 and extends vertically from the shoulder. The ring 53 is the same height as or slightly higher than the lower edge of the mask 35. The ring 53 is dimensioned so that the inner surface thereof is located at a short distance radially outward from the aperture 39, and thus from the LEDs. The inner surface of the ring forms a smooth, cylindrical surface.

Various segments of the outer surface of the acrylic ring are contoured. Specifically, each segment 55 of the ring 53 that is in front of one of the LEDs covers at least the 15° field of illumination of the respective LED. The outer surface of each such segment 55 has a horizontal concave contour, so that the segment 55 acts as a lens to disperse the light emitted with the 15° angular range (horizontal) outward to cover approximately a 30° field of illumination. The lens sections 55 do not cause any substantial vertical refraction.

The segments 57 between the lens 55 have a smooth outer surface corresponding to sections of a cylinder. The sections 57 are transparent and pass light, albeit with limited horizontal dispersion. With the lens ring 53, the 12 LEDs 37 can produce a ring of high intensity light for direct illumination up to an elevation of 15° above the horizon but covering a full 360° circle in the horizontal direction.

Again, the LEDs 37 emit a substantial portion of light in directions outside the 15° nominal field of view. The mask 35 and the cavity 33 reflect and diffuse much of this light, and the constructive occlusion of the aperture 39 by the mask 35 produces a substantially omni-directional distribution, with appropriate intensity at elevation angles above the 15° field directly illuminated by the LEDs 37 through the lenses 55.

Figure 9:
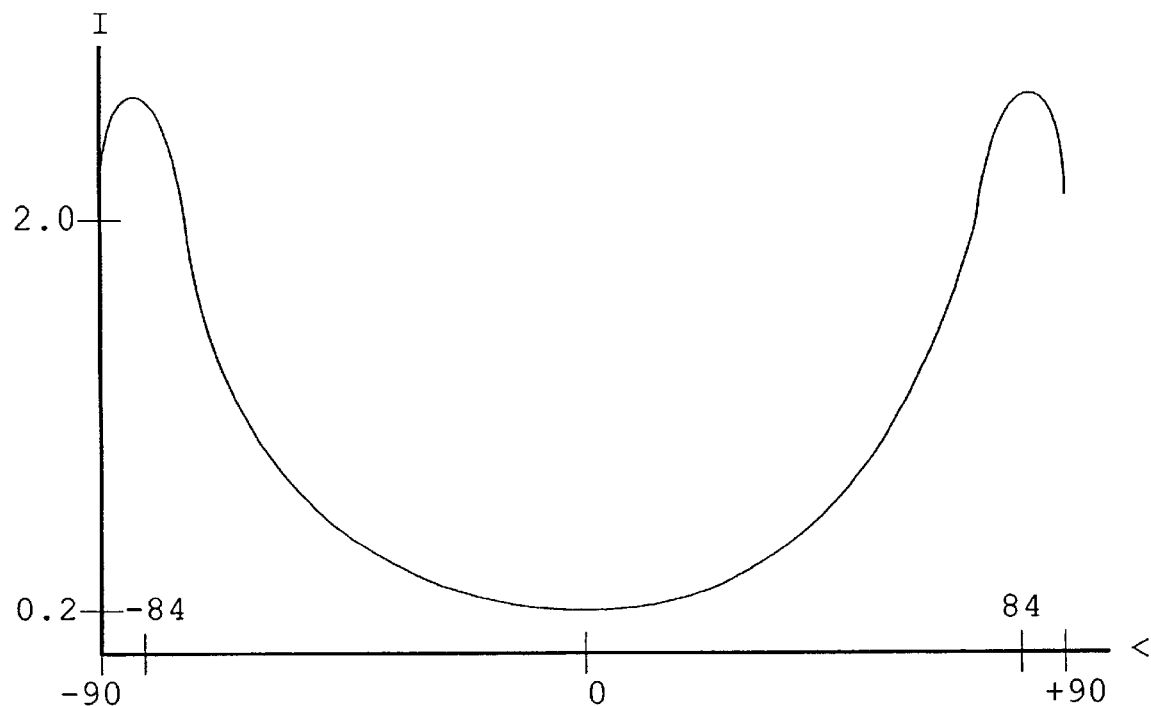
FIG. 9 is an approximation of an illumination intensity distribution graph of an illumination system, such as shown in either FIG. 4 or FIG. 6.

FIG. 9 shows an approximation of the intensity distribution with respect to angle from the axis, for the system 51 of FIGS. 6–8. The system axis represents a 0° angle (vertical), whereas the horizon regions correspond to 90° and −90°. Low elevation angles, near the horizon, would have angles relative to the axis approaching ±90°.

As shown, the system 51 provides relatively high intensity distribution over the regions approaching ±90°, specifically, for approximately 15° above each horizon. This high intensity illumination, from the direct irradiation from the LEDs, provides 2 candela or higher illumination throughout the regions from each horizon (90° or −90°) up to and somewhat beyond the 6° boundary (±84°) specified in the requirements for airport lighting. As the elevation angle passes from the region of direct illumination, the magnitude of the angle with respect to the axis falls, and the direct illumination from the LEDs falls off substantially. The illumination would go to zero nearer the axis, but with the invention, such regions are illuminated by the constructive occlusion mask-and-cavity system. As the angle approaches the axis, the total illumination drops, but only to an average level at or slightly above 0.2 candela, fully satisfying the requirements for illumination in the region over the light fixture, set for airport lighting applications. Those skilled in the art will recognize that the lighting system 51 will have a variety of other applications.

Figure 10:
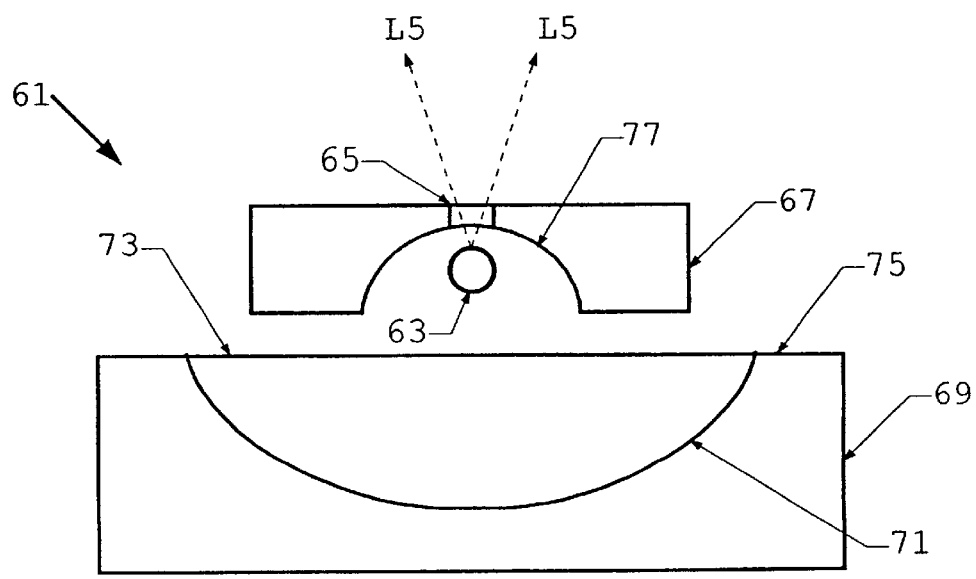
FIG. 10 is a cross-sectional view of an alternate embodiment of the invention combining constructive occlusion with direct view through an aperture of the mask.

FIG. 10 illustrates another embodiment of the invention. The lighting system 61 of FIG. 10 is generally similar to the system 11 of FIG. 1, with the principal difference being that the source 63 directly illuminates a region about the system axis through an aperture 65 through the mask 67.

In this embodiment, the radiant energy distributor includes a base 69 with a cavity 71 formed in the side thereof facing toward the intended field or area to be illuminated. A variety of cavity shapes could be used, depending on the particular lighting application that the system will serve. In the illustrated example, the cavity comprises a segment of a sphere and may be hemispherical.

The rim or edge of the cavity 71 forms an aperture 73. The base 69 includes a flat, ring-shaped shoulder 75 surrounding the aperture 73 of the cavity 71. A disk-shaped mask 67, disposed between the base 69 and the area to be illuminated, occludes a substantial of the aperture 73 of the cavity 71 with respect to that area. At least a portion of the surface of the cavity 71 and the surface(s) of the mask 67 facing the cavity 71 are highly, diffusely reflective. In the preferred embodiment, the entire cavity surface and the shoulder 75 are diffusely reflective.

In this embodiment, the radiant energy emitter 63 is a light bulb illuminated by electrical energy supplied from a ballast or the like (not shown). The mask 67 incorporates a reflector 77 surrounding the light bulb 63, to efficiently project much of the radiant energy from the bulb 125 into the diffusely reflective cavity 71. The inner surface of the reflector 127 may have a specular reflective characteristic but preferably is diffusely reflective.

For an application requiring a high intensity illumination at a region nearer the axis of the system, the mask 67 includes an aperture 65 extending from the reflector 77 through to the opposite surface of the mask 67. The additional aperture 65 enables direct illumination of a predetermined portion of the region specified for illumination by the system 61. In the illustrated example, the aperture 65 is formed above the system axis and enables direct illumination of an area around the axis limited in angle by the size of the aperture, for example between the ray lines L5. The position and size of the aperture are designed to satisfy the requirements of a particular application. For example, for another application, the aperture 65 might be larger or smaller or it might be oriented to emit direct radiation in a region somewhat separate from the central axis.

Figure 11:
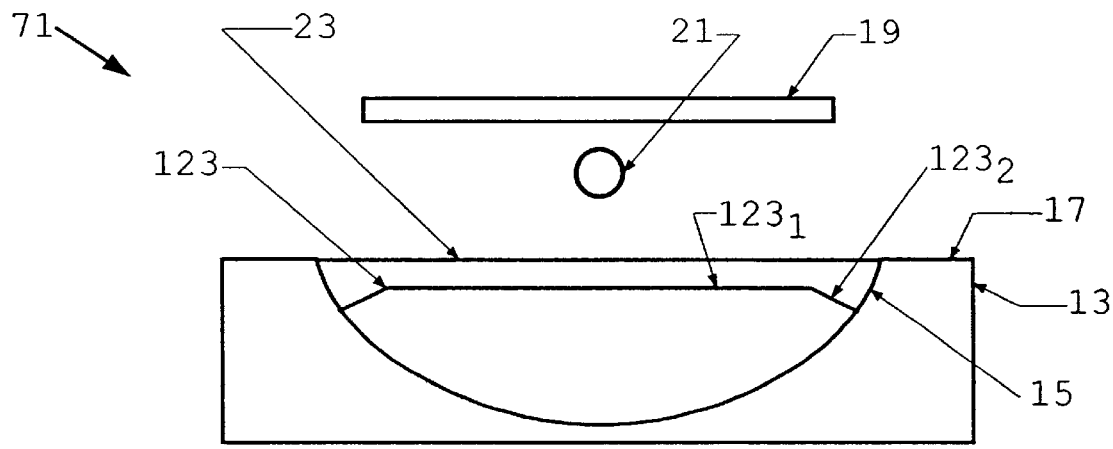
FIG. 11 illustrates another embodiment of the invention, with a "kicker" plate or baffle within the cavity.
Figure 12:
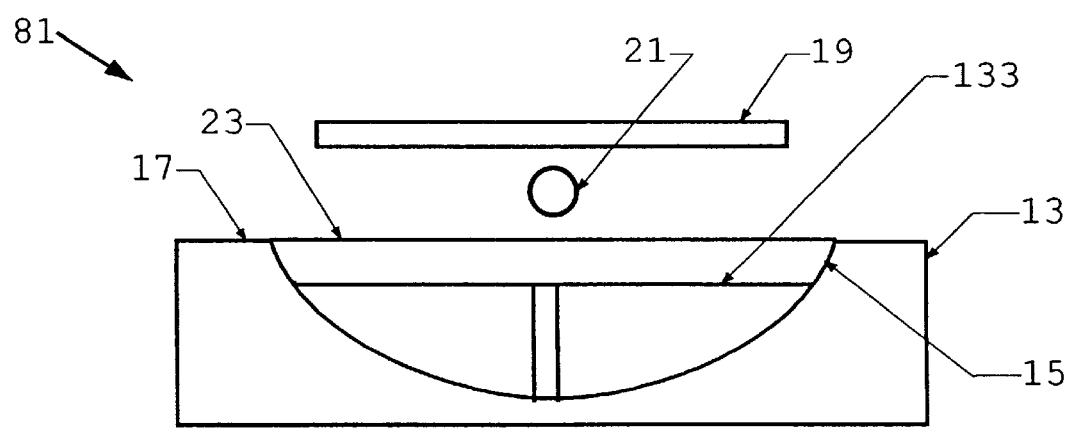
FIG. 12 illustrates another embodiment of the invention, with a baffle formed of radially extending walls within the cavity.

FIGS. 11 and 12 depict still further embodiments of the invention, similar to the embodiment of FIG. 1, but utilizing a baffle or the like within the cavity to serve as a "kicker" to direct additional light out into the regions near the horizon. As in FIG. 1, each of these systems includes a base 13 with a diffusely reflective cavity 15 and a mask 19 positioned to constructively occlude the aperture 23 of the cavity 15. A shoulder, preferably with a reflective surface, surrounds the aperture 23. A source 21 is located in the region between the mask and the cavity so as to directly illuminate certain regions and to direct addition radiation into the cavity 15. In the illustrated examples, the source 21 is mounted beneath and adjacent to the diffusely reflective surface of the mask 19 that faces toward the aperture 23. Each of these embodiments also includes a diffusely reflective element within the cavity, to "kick" additional light from the cavity out toward regions low down near the horizon around the respective system.

The illumination system 71 of FIG. 11 includes a baffle 123 disposed in the cavity 15. The baffle 123 has a flat, circular, planar surface $123_1$ formed about the axis of the mask 23 and the cavity 15. The baffle or kicker 123 preferably has a shape corresponding to the shape of the cavity and its aperture.

The planar surface $123_1$ is substantially parallel to the cavity aperture 23. As illustrated, the surface $123_1$ is disposed within the cavity 15 at a distance from the aperture (below the aperture in the illustrated orientation). However, the surface $123_1$ could be in the plane of the aperture or on a plane between the aperture and the mask, depending on the distribution characteristic desired. The edges of the circular baffle are beveled to form a ring-like annular surface $123_2$ at an angle with respect to the planar central surface $123_1$. The baffle 123 may substantially fill the inner portion of the cavity, as shown, or the baffle 123 may comprise a beveled disk or plate extending across the cavity 15. The baffle is located within the cavity and beveled in such a manner as to leave a segment of the cavity surface around the aperture exposed to light. At least this segment of the cavity 115 and the exposed surfaces of the baffle 123 are highly, diffusely reflective. The baffle 123 serves to reflect more of the light from the lamp 21 out to the periphery of the desired illumination footprint, further increasing the intensity provided in those regions.

When viewed from the area illuminated, the source 21 appears brightest, and next the planar surface $123_1$ appears brightest. Some light reflected from points on the planar surface $123_1$ is directed towards regions relatively far-off the axis of the system at low elevational angles only slightly above the horizon. There will be some overlap with the direct illumination from the source 21. The angled annular surface $123_2$ of the baffle 123 will appear to the observer to be slightly dimmer than the surface $123_1$. The light from this surface will fill in an area of the footprint somewhat above and closer to the axis than that illuminated by the planar surface $123_1$, and the intensity will tend to decrease as the angle approaches the system axis (higher elevational angles). The segment of the cavity 15 exposed around the edge of the baffle plate 123 also diffusely reflects some light into the area of intended illumination. However, because of the angle of this segment, when viewed from the area illuminated the segment appears dimmer than either the surface $123_1$ or the surface $123_2$. The light from this surface will fill in an area of the footprint in regions closer to the axis than those illuminated by light reflected from surfaces of the baffle 123, and this light will tend to decrease further in intensity as the angle of emission approaches the axis. Each of the diffusely reflective surfaces of the baffle 123 and the diffusely reflective exposed segment of the cavity 15 will also reflect some light back for further reflection and diffusion between the mask, the cavity and the baffle.

The diffusely reflective shoulder 17 also will direct at least some of the light into the field of intended illumination. The intensity distribution of light reflected from the shoulder when measured at a distance from the device tends to form a bell shaped curve, centered about the axis of the device (vertical in FIG. 7). However, because of the geometry of the system, the intensity of the light reflected from the shoulder is much smaller than that provided by direct radiation from the source or that emitted from reflection from the cavity and the baffle surfaces.

Each point on the device components that is diffusely reflective will reflect light in many different directions. The mask, cavity, baffle and reflector will reflect and diffuse each beam of light from the source many times before emission from the system. However, because of the highly reflective nature of the material surfaces, the device remains extremely efficient, with relatively little light absorbed within the system. The careful tailoring of the intensity distribution in fact maximizes the amount of emitted light kept within useful portions of the illuminated footprint and optimizes the distribution thereof, to maximize illumination efficiency within that area for a particular lighting application.

In the example shown, the baffle 123 is symmetrical about the system axis. In some embodiments, it may be desirable to vary the contour of the baffle on different sides of the device. For example, on one pair of sides, the bevels might appear essentially as shown in FIG. 11, whereas when viewed in cross-section at a right angle to the illustrated view, the bevel of the annular surface might cut more deeply, either at a different angle or further back toward the axis of the baffle. In the illustrated example, the planar surface $123_1$ is circular. In a version having a modified bevel to the annular surface, the planar surface $123_1$ might become oval or elliptical.

FIG. 12 discloses an alternate embodiment, similar to the embodiment of FIG. 11 but having a different baffle structure. In this embodiment, the baffle 133 is disposed entirely within the cavity 15. The baffle 133 comprises an assembly of plates forming reflective walls at right angles to each other, projected upward from the inner wall of the cavity 15 toward the aperture 23 and the underside of the mask 19. The baffle plates divide the cavity into quadrants. Although shown as four walls extending at right angles to one another, those skilled in the art will recognize that the baffle may comprise fewer radially extending walls or more radially extending walls, e.g. three walls at 120° angles or five walls at 72° angles. In other embodiments not shown, but similar to FIG. 12, the baffle structure may be formed on the surface of the mask facing toward the aperture.

The embodiments discussed in detail above can meet the illumination requirements of many applications. Examples discussed included lighting fixtures intended to provide uniform planar illumination over a wide area and specialized lighting systems for airport taxiways or runways. However, the principles of the invention also support many other applications. Another example of an application of the invention relates to emergency lighting systems, to enable personnel to exit a facility in the event of a failure of the regular lighting system. Typically, the light fixture is ceiling or wall mounted. The emergency light must project a large quantity of light laterally and provide some light in regions closer to the system axis. Again, the combination of direct lighting and constructive occlusion provides a highly efficient solution to the distribution requirements of this type of lighting application. Using fixtures constructed in accord with the invention, it is possible to illuminate a long exit path with a consistently uniform intensity, for example at 1 foot-candle, without any excessive fluctuations in intensity along the path and with fewer light fixtures. The concepts of the invention also find application in emergency enunciator systems, i.e. the flashing strobe lights used to alert personnel of the emergency need for evacuation of the facility.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A system for projecting electromagnetic radiation, comprising:
    a) a base having a first defined area substantially facing a region to be illuminated with the electromagnetic radiation, the first defined area having a reflective characteristic with respect to the electromagnetic radiation;
    b) a mask between the base and the region to be illuminated at a predetermined distance from the first defined area, said mask having a second defined area substantially facing the first defined area and having a reflective characteristic with respect to the electromagnetic radiation;
    c) a cavity formed in one of the first and second defined areas, said cavity comprising an inner surface with a substantially diffuse reflective characteristic with respect to the electromagnetic radiation and an opening, a perimeter of the opening of the cavity forming an aperture, wherein the mask is positioned relative to the base and configured so as to occlude electromagnetic radiation emerging from the aperture of the cavity with respect to illumination of the region; and
    d) a source configured to emit a substantial first portion of the electromagnetic radiation directly into a predetermined section of the region to be illuminated and to emit a substantial second portion of the electromagnetic radiation into the cavity, such that: the direct radiation provides a relatively high intensity illumination in the predetermined section; and the base, mask and cavity provide a tailored intensity distribution of the second portion of the electromagnetic radiation over another predetermined section of the region to be illuminated, the tailored intensity distribution including a relatively low intensity illumination.

2. A system as in claim 1, wherein the relatively high intensity illumination is approximately an order of magnitude higher than the relatively low intensity illumination.

3. A system as in claim 2, wherein the relatively low intensity illumination is at or near the axis of the system, and the predetermined section illuminated with the relatively high intensity covers a range of angles substantially separated from the axis of the system.

4. A system as in claim 3, wherein the range of angles approaches angles perpendicular to the system axis.

5. A system as in claim 3, wherein the first defined area and the second defined area exhibit a highly diffuse reflectivity with respect to the electromagnetic radiation.

6. A system as in claim 5, wherein the source emits visible light, and the highly diffuse reflectivity is with respect to visible light.

7. A system as in claim 3, wherein the base, the mask, the cavity and the source are arranged so that the system illuminates a predetermined area of a planar surface with a substantially uniform intensity.

8. A system for projecting electromagnetic radiation, comprising:
    a) a base having a first defined area substantially facing a region to be illuminated with the electromagnetic radiation, the first defined area having a reflective characteristic with respect to the electromagnetic radiation;
    b) a mask between the base and the region to be illuminated at a predetermined distance from the first defined area, said mask having a second defined area substantially facing the first defined area and having a reflective characteristic with respect to the electromagnetic radiation;
    c) a cavity formed in one of the first and second defined areas, said cavity comprising an inner surface with a substantially diffuse reflective characteristic with respect to the electromagnetic radiation and an opening, a perimeter of the opening of the cavity forming an aperture, wherein the mask is positioned relative to the base and configured so as to occlude electromagnetic radiation emerging from the aperture of the cavity with respect to illumination of the region; and
    d) a source configured to emit a substantial first portion of the electromagnetic radiation directly into a predetermined section of the region to be illuminated and to emit a substantial second portion of the electromagnetic radiation into the cavity, such that: the direct radiation provides a relatively high intensity illumination in the predetermined section; and the base, mask and cavity provide a tailored intensity distribution of the second portion of the electromagnetic radiation over another predetermined section of the region to be illuminated, the tailored intensity distribution including a relatively low intensity illumination, wherein:

the cavity is formed in the base, and the second defined reflective area faces toward the aperture of the cavity; and the source is positioned between the second defined reflective area and the aperture of the cavity.

9. A system as in claim 1, wherein:

the cavity is formed in the base, and the second defined reflective area faces toward the aperture of the cavity; and at least a portion of the source is positioned within a volume of the cavity.

10. A system as in claim 1, further comprising a reflective shoulder surrounding at least a substantial portion of the first defined reflective area.

11. A system as in claim 10, wherein the shoulder has a substantially diffuse reflective characteristic with respect to the electromagnetic radiation.

12. A system as in claim 1, further comprising a reflective baffle positioned between the mask and the inner surface of the cavity.

13. A system as in claim 12, wherein the baffle comprises a planar surface extending parallel to the aperture about an axis of the cavity, aperture and mask.

14. A system as in claim 13, wherein the baffle further comprises an annular surface, formed at an angle with respect to the planar surface and extending from the planar surface to the inner wall of the cavity.

15. A system as in claim 12, wherein the baffle comprises a plurality of reflective walls extending radially outward from a axis of the mask and cavity so as to divide a region between the mask and the inner surface of the cavity into sections.

16. A system as in claim 15, wherein the baffle comprises four walls and the walls divide the region between and the inner surface of the cavity the mask into quadrants.

17. A lighting system, comprising:
a cavity having a diffusely reflective inner surface and an aperture;
a mask positioned outside the cavity at a distance from the aperture, the mask having a reflective surface optically facing the aperture, the mask constructively occluding the aperture of the cavity with respect to a field of intended illumination, such that light reflected between the mask and cavity and emerging from a gap between the mask and the aperture illuminates a substantial portion of the field of intended illumination with a desired intensity distribution pattern; and
a source of light positioned between the mask and the inner surface of the cavity so as to emit a first portion of light for diffuse reflection between the mask and the cavity and thereby produce the illumination with the desired intensity distribution, the source also emitting a substantial second portion of light directly into a predetermined section of the field of intended illumination, to provide a desired higher intensity distribution in said predetermined section.

18. A lighting system as in claim 17, wherein the predetermined section of the field of intended illumination covers a range of angles approaching a horizon of the lighting system, the substantial portion of the field of intended illumination light covers a range of angles approaching a system axis substantially perpendicular to the horizon of the lighting system.

19. A lighting system as in claim 17, wherein the mask, the cavity and the source are arranged so that the system illuminates a predetermined area of a planar surface with a substantially uniform light intensity.

20. A lighting system as in claim 17, further comprising a reflective shoulder surrounding a substantial portion of the aperture of the cavity.

21. An airport lighting system, comprising:
a cavity having a diffusely reflective inner surface and an aperture;
a shoulder, having a reflective surface characteristic, surrounding at least a portion of the aperture of the cavity;
a mask positioned outside the cavity at a distance from the aperture, between the aperture and a region to be illuminated, the mask having a reflective surface facing toward the aperture;
a source of radiant light energy positioned between the mask and the aperture, wherein:
the mask is sufficiently spaced from the base cavity such that the source directly emits a substantial first portion of the radiant light energy into a first predetermined section of the region to be illuminated adjacent to a horizon of the system with a relatively high intensity,
the source emits a second portion of the radiant light energy into the cavity, and
the reflective surface of the mask constructively occludes the aperture of the cavity so that the system radiates the second portion of the radiant light energy with a tailored intensity distribution to thereby illuminate a second predetermined section of the region to be illuminated at higher elevations above the horizon with a relatively lower intensity.

22. A system as in claim 21, wherein the relatively high intensity illumination comprises illumination approximately an order of magnitude higher than at least some of the relatively low intensity illumination.

23. A system as in claim 21, wherein the illumination at the higher order of magnitude covers a range of elevation angles from the horizon of the system up to at least 6° above the horizon of the system.

24. A system as in claim 23, wherein the relatively low intensity illumination covers a range of angles about an axis of the mask and cavity.

25. A system as in claim 21, wherein the source comprises at least one light emitting diode.

26. A system as in claim 25, wherein the at least one light emitting diode comprises a plurality of light emitting diodes arranged about an axis of the mask and cavity to emit the first portion of the radiant light energy radially outward from the axis.

27. A system for projecting electromagnetic radiation with a tailored intensity distribution having a high intensity portion in a first angular region of an area to be illuminated and a low intensity portion in a second angular region of the area to be illuminated, the system comprising:
a diffusely reflective cavity with an aperture;
a mask positioned outside the cavity so as to constructively occlude the aperture with respect to at least the second angular region, the mask having a reflective surface facing toward the aperture; and
means for directly illuminating the first angular region with electromagnetic energy to provide the high intensity portion of the illumination distribution and for supplying electromagnetic radiation into the cavity to provide the low intensity portion of the illumination distribution.

28. A system for projecting electromagnetic radiation as in claim 27, wherein the means comprises a source of electromagnetic energy positioned between the reflective surface of the mask and an inner surface of the cavity in such a manner as to directly illuminate the first angular region and to supply at least some electromagnetic radiation into the cavity.

29. A system as in claim 28, wherein the source comprises a plurality of light emitting diodes arranged about an axis of the cavity and mask, each light emitting diode being oriented to emit light for the direct substantial illumination outward from the axis.

* * * * *